(12) United States Patent
Winger

(10) Patent No.: US 7,860,168 B2
(45) Date of Patent: Dec. 28, 2010

(54) METHOD AND APPARATUS FOR IMPROVED INCREASED BIT-DEPTH DISPLAY FROM A TRANSFORM DECODER BY RETAINING ADDITIONAL INVERSE TRANSFORM BITS

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1827 days.

(21) Appl. No.: 10/974,103

(22) Filed: Oct. 27, 2004

(65) Prior Publication Data

US 2006/0088106 A1 Apr. 27, 2006

(51) Int. Cl.
*H04N 7/12* (2006.01)
(52) U.S. Cl. .............................. 375/240.24; 375/240.29
(58) Field of Classification Search ................ 348/565, 348/254; 375/240, 240.01, 240.12, 240.2, 375/240.21, 240.24, 240.29, 240.25; 345/589
See application file for complete search history.

(56) References Cited

U.S. PATENT DOCUMENTS

| 5,828,421 | A | * | 10/1998 | Boyce et al. ................. 348/565 |
| 6,104,359 | A | * | 8/2000 | Endres et al. ............... 345/589 |
| 6,549,577 | B2 | * | 4/2003 | Florencio et al. ....... 375/240.21 |
| 7,352,398 | B2 | * | 4/2008 | Sano .......................... 348/254 |

* cited by examiner

*Primary Examiner*—Allen Wong
(74) *Attorney, Agent, or Firm*—Christopher P. Maiorana, PC

(57) ABSTRACT

A method and apparatus for processing a video block extracted from an encoded bitstream. The method generally includes the steps of (A) generating a normal block by inverse transforming the video block, the normal block having a normal resolution, (B) generating an alternate block from the video block, the alternate block comprising image detail (i) present after the inverse transforming and (ii) absent from the normal block and (C) generating an output block based on the normal block and the alternate block, the output block having an output resolution greater than the normal resolution.

23 Claims, 6 Drawing Sheets

METHOD AND APPARATUS FOR IMPROVED INCREASED BIT-DEPTH DISPLAY FROM A TRANSFORM DECODER BY RETAINING ADDITIONAL INVERSE TRANSFORM BITS

FIELD OF THE INVENTION

The present invention relates to video decoding generally and, more particularly, to a method and apparatus for improved increased bit-depth display from a transform decoder by retaining additional inverse transform bits.

BACKGROUND OF THE INVENTION

Contouring is a known video/image artifact that is particularly noticeable in smooth luminance or chrominance regions, particularly in dark regions with smooth chrominance. Contouring is also noticeable where a large amount of content is compressed using block transforms (i.e., 8×8 discrete cosine transforms and 4×4 integer discrete cosine transforms). For areas with gradual chroma gradient, digital cinema people, and to a lesser extent, high definition DVD people are very concerned with the ability of existing 8-bit video to avoid contouring. Some conventional solutions to contouring include dithering and noise addition. Other conventional solutions involve increasing a bit depth of the video equipment from end to end (i.e., from an 8-bit depth to a 10-bit depth).

Recently, consumer liquid crystal display (LCD) manufacturers, such as Samsung and Sharp, have been developing 10-bit consumer LCD displays. The 10-bit displays are likely to become an increasingly common device-output and display format. Therefore, an incentive exists to decompress available 8-bit compressed video content with as much accuracy as possible.

Existing solutions for decoding 8-bit transform compressed video/images are not as accurate as possible. Just before a last stage of an inverse transform, conventional solutions discard (i.e., round away) several bits of information that are available about how the compressed video bitstream has approximated an original video signal. Therefore, solutions that attempt to produce 10-bit video from 8-bit decoded video (the output of a standard transform decoder) are at a disadvantage to a solution that retains the information available in the normally discarded bits. The discarded bits represent a best known approximation of the additional bits that are available from the compressed bitstream but thrown away.

SUMMARY OF THE INVENTION

The present invention concerns a method and apparatus for processing a video block extracted from an encoded bitstream. The method generally comprises the steps of (A) generating a normal block by inverse transforming the video block, the normal block having a normal resolution, (B) generating an alternate block from the video block, the alternate block comprising image detail (i) present after the inverse transforming and (ii) absent from the normal block and (C) generating an output block based on the normal block and the alternate block, the output block having an output resolution greater than the normal resolution.

The objects, features and advantages of the present invention include providing a method and/or apparatus for improved increased bit-depth display that may provide (i) little to no visible contouring, (ii) a close approximation of an original picture, (iii) a smooth interpolation of 8-bit video data and/or (iv) drift free decoding.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention is generally related to an FRExt version of an H.264 standard ("Advanced Video Coding", International Telecommunication Union-Telecommunication Standardization Sector, Geneva, Switzerland) that permits very fine quantization. The FRExt version of the H.264 standard uses a weighting matrix in combination with a normal quantizer control. By using a small enough weighting value and a small enough quantizer value, a quantizer stage may expand rather than compress video data during authoring. Therefore, a 10-bit video source may be compressed into an 8-bit stream and then decompressed at 8 to 10 bits of fidelity. In particular, the "expanding" quantization process may be performed on areas of the source video susceptible to contouring. The present invention generally retains/stored some of the image details (e.g., least significant bits) from an inverse transform function prior to a bit-depth reduction and rounding function to provide an enhanced picture.

Figure 1:
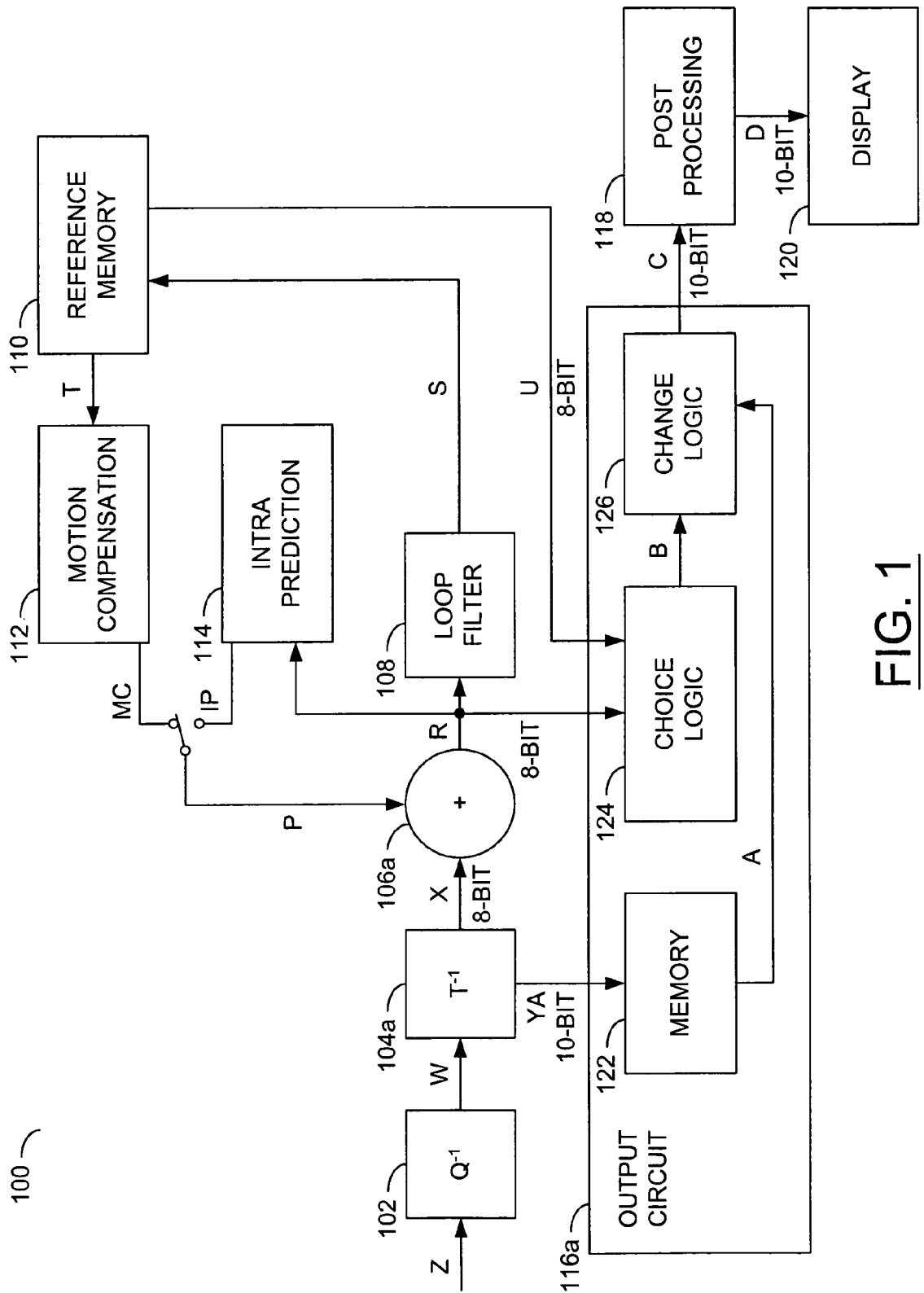
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus 100 may be implemented as a decoder apparatus (or system). The decoder apparatus 100 generally comprises an inverse quantization circuit (or module) 102, an inverse transform circuit (or module) 104a, a predictor adder circuit (or module) 106a, a loop filter circuit (or module) 108, a reference memory circuit (or module) 110, a motion compensation circuit (or module) 112, an intra prediction circuit (or module) 114, an output circuit (or module) 116a, one or more optional post processing circuits (or modules) 118 and a display 120.

The decoder apparatus 100 may receive a block of data (or signal) (e.g., Z) from a reorder circuit (not shown) at the inverse quantization circuit 102. A block (or signal) (e.g., W) may be presented from the inverse quantization circuit 102 to the inverse transform circuit 104a. A block (or signal) (e.g., X) may be presented from the inverse transform circuit 104a to the predictor adder circuit 106a. A block (or signal) (e.g., YA) may be presented from the inverse transform circuit 104a to the output circuit 116a. The predictor adder circuit 106a may receive a block (or signal) (e.g., P) from, one at a time, the motion compensation circuit 112 or the intra prediction circuit 114. The predictor adder circuit 106a may present a block (or signal)(e.g., R) to the loop filter circuit 108, the intra prediction circuit 114 and optionally to the output circuit 116a.

A block (or signal) (e.g., S) may be presented by the loop filter circuit 108 to the reference memory circuit 110 and optionally to the output circuit 116a. The reference memory 110 may present a frame (or field or signal) (e.g., T) to the motion compensation circuit 112. A block (or signal) (e.g., U) may be presented from the reference memory circuit 110 to the output circuit 116a. A block (or signal)(e.g., MC) may be generated by the motion compensation circuit 112. A block (or signal) (e.g., IP) may be generated by the intra prediction circuit 114. The motion compensation block MC and intra-prediction block IP may be directed to the predictor adder circuit 106a as the predictor block P. The output circuit 116a may present a block (or signal) (e.g., C) to the post processing circuit 118. The post processing circuit 118 may present a signal (or block, field or frame) (e.g., D) to the display 118.

The inverse quantization circuit 102 may be operational to generate the rescaled block W by inverse quantizing the block Z. The block Z may be a luminance block, a chrominance block or other similar block of image information. The block Z may have a size of 2×2 elements, 4×4 elements, 8×8 elements and/or 16×16 elements. Other block sizes may be implemented to meet the criteria of a particular application.

The inverse transform circuit 104a may be operational to generate both of the normal block X and the alternate block YA by performing an inverse discrete cosine transform (IDCT) on the rescaled block W. The normal block X may be generated with a normal resolution of 8-bits. The alternate block YA may be generated as one or more least significant bits (e.g., 3 LSBs) of a higher resolution version of the normal block X (see FIG. 6).

The predictor adder circuit 106a may be operational to add the predictor block P to the normal block X to generate the reconstructed block R. The loop filter circuit 108 may be operational to filter the reconstructed block R to present the filtered block S to the reference memory 110. The reference memory 110 may operational to store reference frames for use in motion compensation reconstruction of the received pictures. Other blocks may also be stored in the reference memory 110 for intra-prediction operations and picture reordering operations prior to display.

The reference frame T may be one or more blocks transferred from the reference memory 110 to the motion compensation circuit 112 depending on the particular normal block X being reconstructed and one or more associated motion vectors. The motion compensation circuit 112 may be operational to present the motion compensated block MC to the predictor adder circuit 106a as the predictor block P. The intra prediction circuit 114 may be operational to present the intra-prediction block IP to the predictor adder circuit 106a as the predictor block P.

The output circuit 116a may be operational to generate a block (or signal) (e.g., C) to the post processing circuit 118 based on the alternate block YA and one of (i) the reconstructed block R or (ii) the reference block U read from the reference memory circuit 110. The output block C may be generated at an output resolution (e.g., 10-bit) greater than the normal resolution. The post processing circuit 118 may be operational to generate the display signal D from the output block C. The display signal D may also be generated at the output resolution. Post processing may include, but is not limited to, one or more of deblocking, dithering, comfort noise addition, noise reduction and the like. The display signal D may be viewable on the display 120.

The output circuit 116a generally comprises a memory circuit (or module) 122, a circuit (or module) 124 and a circuit (or module) 126. The circuit 124 may be referred to as a choice logic circuit. The circuit 126 may be referred to as a change logic circuit. A block (or signal)(e.g., A) may be presented from the memory circuit 122 to the change logic circuit 126. A block (or signal) (e.g., B) may be presented from the change logic circuit 124 to the change logic circuit 126. The output circuit 116a may be configured to support the 10-bit display 120 with extra bits retained from the inverse transform, but not the inverse loop filter, using minimal additional logic compared to conventional decoder implementations.

The memory circuit 122 may be operational to generate the buffered block A by buffering the alternate block YA for a short time. The choice logic circuit 124 may be operational to generate the low resolution block B as one of (i) the reconstructed block R or (ii) the reference block U. The change logic circuit 126 may be operational to generate the output block C based on both the buffered block A and the low resolution block B.

The choice logic circuit 124 may follow a supplementary enhancement information (SEI) suggestion in deciding between the reconstructed block R and the reference block U. Storage may be provided in the choice logic circuit 124 for multiple reference blocks U if the reconstructed block R (e.g., pre-loop filtered information) is used and frame reordering is implemented. For example, the storage may enable reordering (e.g., delayed display) of the display signal D to the display 120 as compared with the ordering of the blocks Z.

The change logic circuit 126 may be operational to generate the high resolution output block C by combining the buffered block A and the low resolution block B. The change logic circuit 126 may undo a standard rounding in the reconstructed block R and/or the reference block U performed by the inverse transform circuit 104a. The standard rounding may be undone by subtracting a 1-bit number from each image element (e.g., a luminance value or a chrominance value) determined by a most significant bit of a respective image element in the buffered block A (e.g., a 3rd LSB). The 3-bit image elements from the buffered block A may then be appended to the respective image elements in the low resolution block B to produce 11-bit image elements. The 11-bit image elements may be rounded to 10 bits using unbiased or biased rounding. The resulting output block C is generally most accurate for display pixel information unchanged by the loop filter circuit 108.

Figure 2:
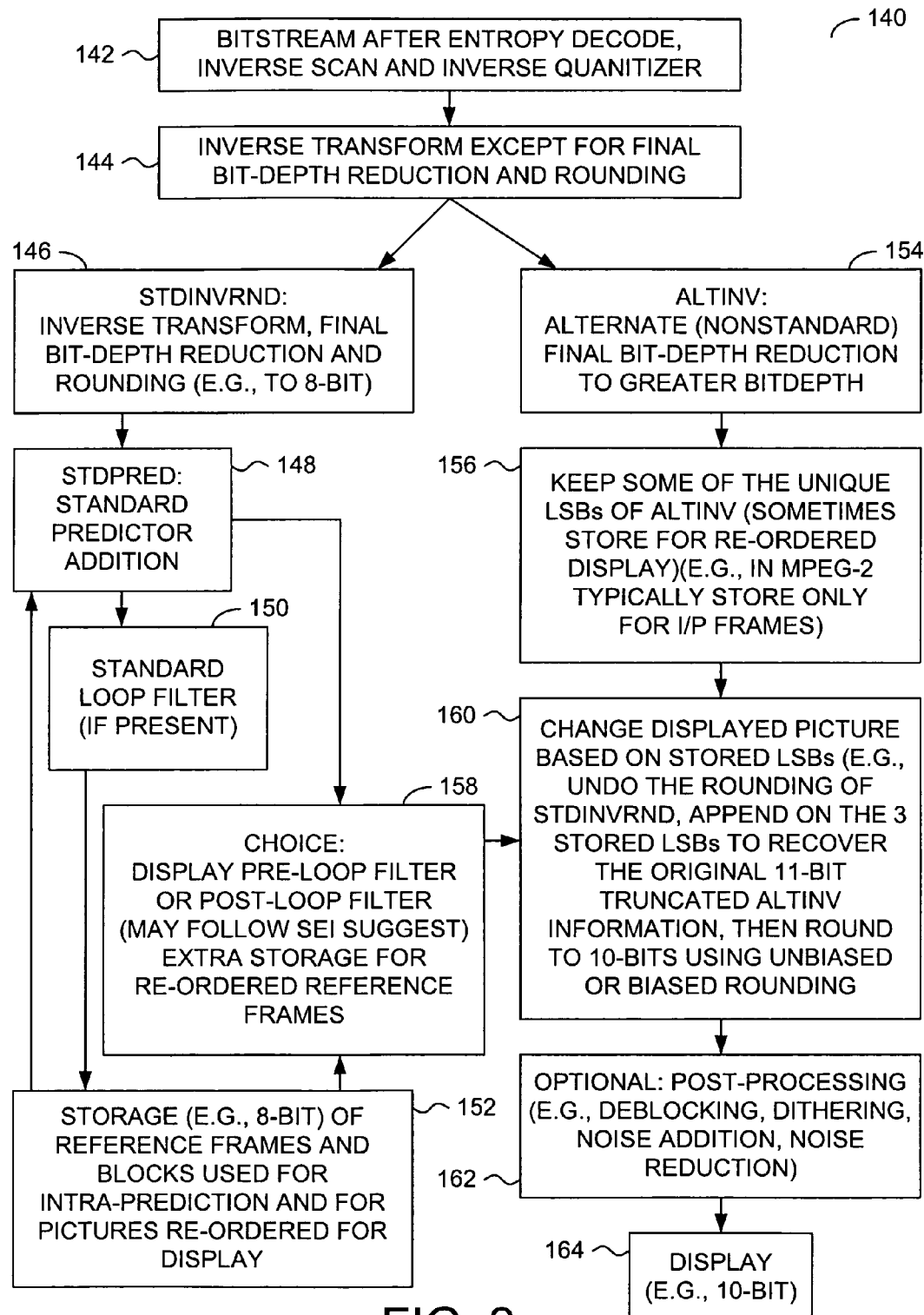
FIG. 2 is a flow diagram of an example method of operation for the apparatus.

Referring to FIG. 2, a flow diagram of an example method 140 of operation for the decoder apparatus 100 is shown. The method 140 generally comprise a step (or function) 142, a step (or function) 144, a step (or function) 146, a step (or function) 148, a step (or function) 150, a step (or function) 152, a step (or function) 154, a step (or function) 156, a step (or function) 158, a step (or function) 160, a step (or function) 162 and a step (or function) 164.

The block Z extracted from a bitstream may be inverse quantized by the inverse quantization circuit 102 after entropy decoding and reordering (e.g., step 142). The inverse transform circuit 104a may inverse transform the block Z, except for final bit-depth reduction and rounding (e.g., step 144). The inversed transformed block may undergo final bit-depth reduction and rounding (e.g., step 146) to generate the 8-bit normal block X. Loop filtering may be applied to the normal block X (e.g., step 150), if the loop filter circuit 108 is implemented in the decoder apparatus 100. The filtered block S may be stored in the reference memory 110 (e.g., step 152).

The inverse transform circuit 104a may perform alternate bit-depth reduction and alternate rounding on the alternate block YA (e.g., step 154). The alternate bit-depth reduction may truncate the inverse transformed data to an 11-bit or a 12-bit accuracy. The optional alternate rounding operation may change the 12-bit accuracy to the 11-bit accuracy. The alternate rounding operation may utilize a least significant bit from the standard final bit-depth reduction and rounding (e.g., step 146) for accurate recovery.

The memory circuit 122 may store only one or more LSBs in the alternate block YA (e.g., step 156) since the more significant bits are generally the same as in the normal block X, which may be stored in the reference memory circuit 110. The bits of the alternate block YA may convey image detail absent from the normal block X due to the standard bit-depth reduction and rounding operations. Generally, the alternate block YA may store a number of bits matching a difference between a truncated transform resolution and the normal resolution (e.g., store 3 bits for an 11-bit truncated transform and an 8-bit normal bit-depth). Storage in the memory circuit 122 may also enable display reordering. For an MPEG-2 implementation, blocks from I frames and P frames only may be stored.

The choice logic circuit 124 may generate the low resolution block B as one of the reconstructed block R and the reference block U (e.g., step 160). Use of only one source of the reconstructed block R or the reference block U may be fixed in an implementation (e.g., operate only with the reference blocks U) or dynamically switch between sources. The optional storage may be eliminated if a reorder capability is not implemented.

The change logic circuit 126 may append the buffered block A to the low resolution block B on an image element by image element basis to generate the output block C (e.g., step 160). Appending a 3-bit buffered block A to an 8-bit low resolution block B may result in an 11-bit block. Therefore, the change logic circuit 160 may also round the 11-bit block (e.g., step 160) to generate the 10-bit output block C.

The post processing block 118 may be operational to perform additional processing on the output block C (e.g., step 162). The post-processing operations may be configured to accommodate the 10-bit resolution of the output block C and the display signal D. The display 120 may convert the information in the display signal D into a viewable form (e.g., step 164). The display step 164 may operate at a 10-bit resolution or greater to help minimize visible contouring.

Figure 3:
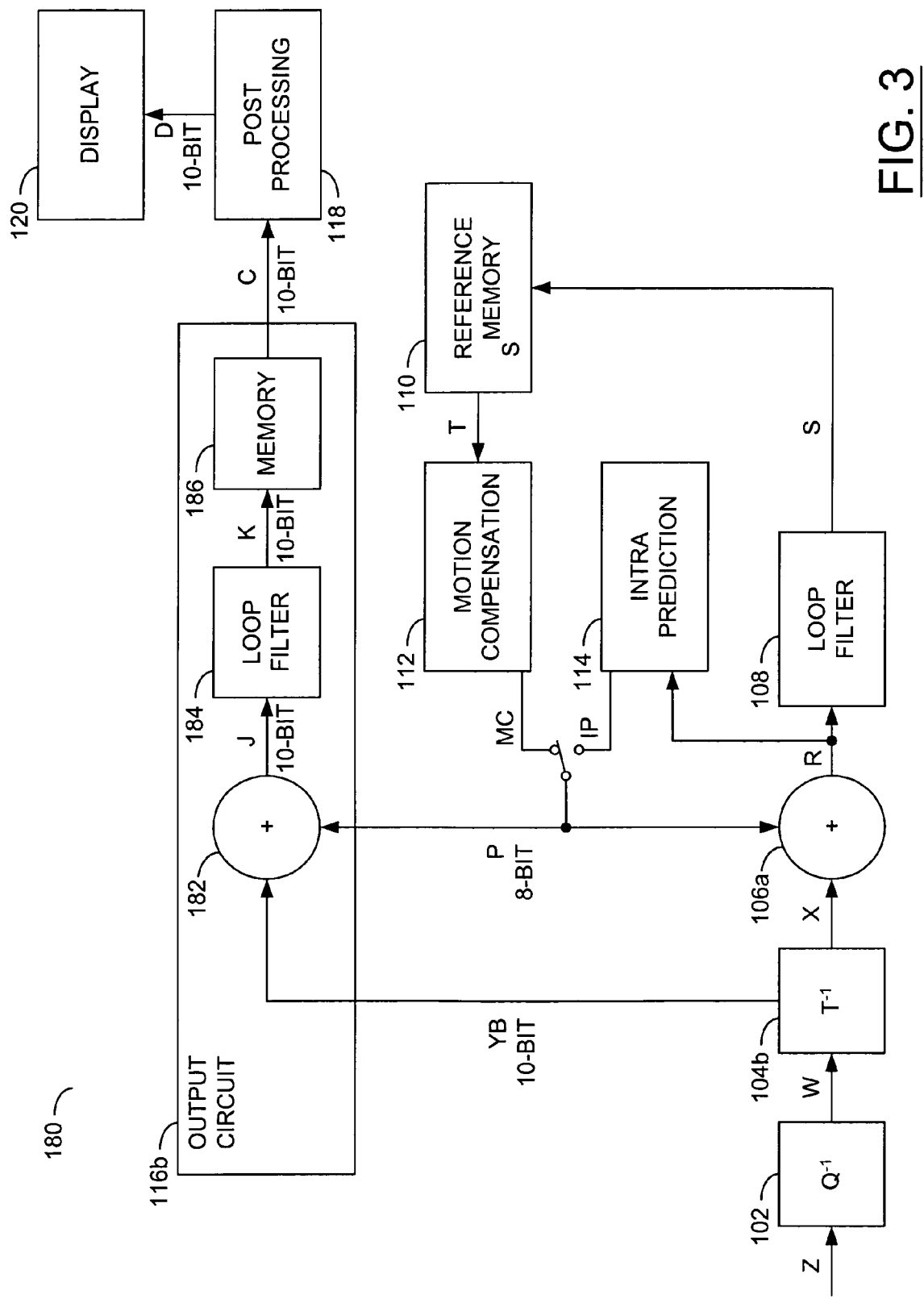
FIG. 3 is a block diagram of an example implementation of a second apparatus.

Referring to FIG. 3, a block diagram of an example implementation of another apparatus 180 is shown. The apparatus 180 may be implemented as a decoder apparatus (or system). The decoder apparatus 180 generally comprises the same circuits as the decoder apparatus 100 with different implementations of an inverse transform circuit 104b and an output circuit 116b. The inverse transform circuit 104b may generate the normal block X and a second alternate block (or signal) (e.g., YB). The output circuit 116b may receive the second alternate block YB and the predictor block P.

The output circuit 116b generally comprises a circuit (or module) 182, a circuit (or module) 184 and an optional memory circuit (or module) 186. The circuit 182 may be implemented as a second predictor adder circuit. The second predictor adder circuit 182 may be configured to add the 10-bit second alternate block YB to the 8-bit predictor block P to generate a 10-bit block (or signal)(e.g., J).

The circuit 184 may be implemented as a second loop filter circuit. The second loop filter circuit 184 may be configured to perform the same basic filtering operation as the loop filter circuit 108, only at a higher bit-depth (e.g., 10-bit). The second loop filter circuit 184 may be operational to generate a block (or signal) (e.g., K) by filtering the reconstructed block J. The filtered block K may be optionally stored in the memory circuit 186 and presented as the output block C. The output block C may undergo optional post processing by the post processing circuit 118 and then displayed by the display 120.

Figure 4:
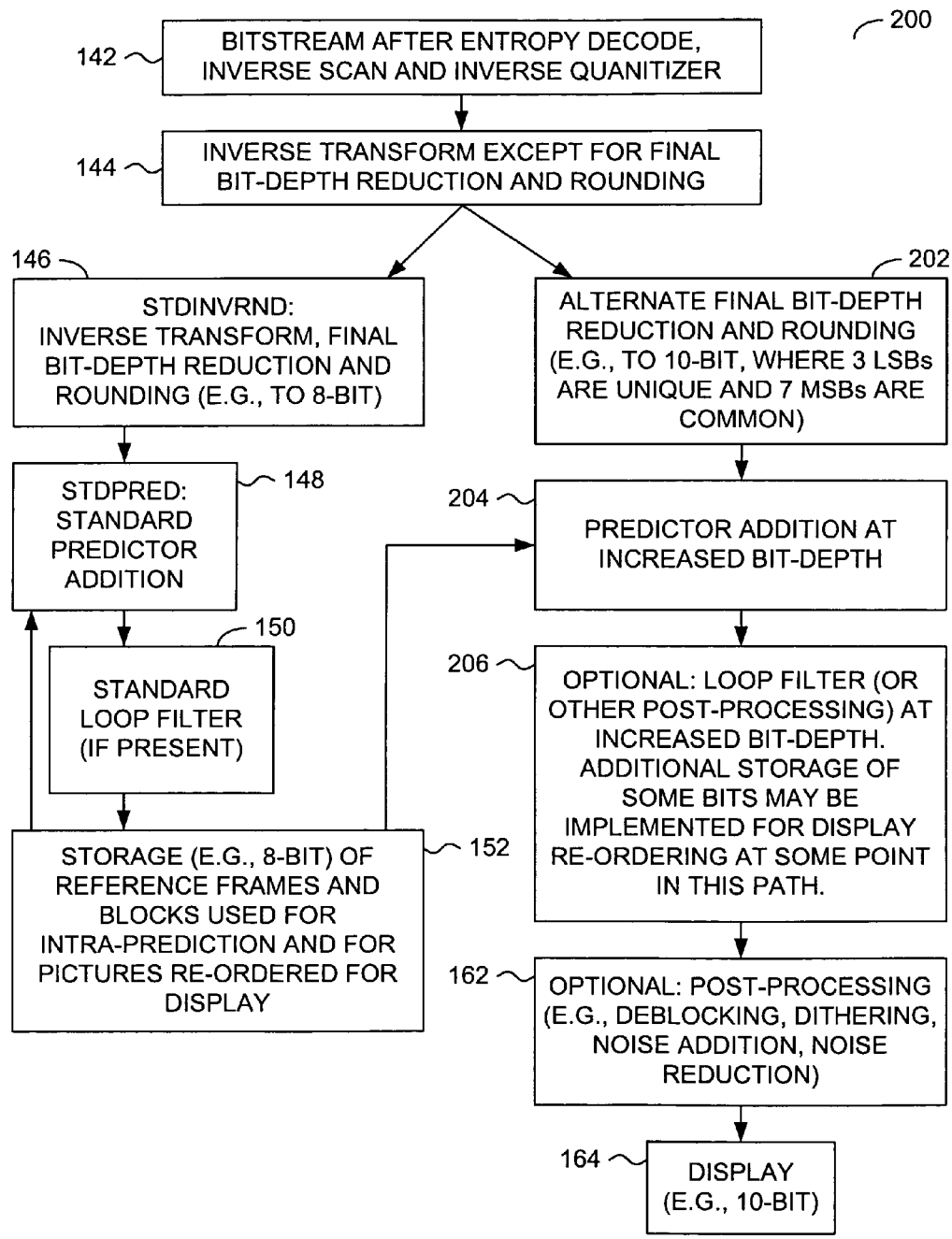
FIG. 4 is a flow diagram of an example method of operation for the second apparatus.

Referring to FIG. 4, a flow diagram of an example method 200 of operation for the decoder apparatus 180 is shown. The method 200 generally comprises the inverse quantization step 142, the inverse transform step 144, the standard bit-depth reduction and rounding step 146, the standard predictor addition step 148, the optional standard loop filtering step 150, the storage step 152, a step (or function) 202, a step (or function) 204, a step (or function) 206, the optional post processing step 162 and the display step 164.

After the inverse transform step 144, the inverse transform circuit 104b may be operational to generate the second alternate block YB to a higher resolution (e.g., 10-bit) than the normal block X (e.g., step 202). The step 202 may include a final bit-depth reduction operation (e.g., to 11-bit) and rounding operation (e.g., to 10-bit). The resulting image elements in the second alternate block YB may have the 7 most significant bits matching the 7 most significant bits of the normal block X. The 3rd least significant bit in the second alternate block YB may or may not match the least significant bit in the normal block X, depending on the individual inverse transformed values. Generally, the 3 least significant bits in the second alternate block YB may be unique (not available in the normal block X).

The second predictor adder circuit 182 may be operational to add the second alternate block YB to the predictor block P at the increased bit-depth (e.g., 10-bit) (e.g., step 204). The second loop filter circuit 184 may filter the reconstructed block J to generate the filtered block K. Filtering may also be performed at the higher bit-depth (e.g., 10-bit). Filtering at the increased bit-depth generally results in less noticeable contouring due to smaller rounding effects as compared to the filtered block S.

The memory circuit 186 may be operational to present the stored filtered block K as the output block C (e.g., step 206). The memory circuit 186 may enable reordering of the filtered blocks K at any point along a path between the second predictor adder circuit 202 and the post processing circuit 118. Storage for reordering may include a current reconstructed block Jn, a next reconstructed block Jn+1, a previous reconstructed block Jn−1 and/or a second previous reconstructed block Jn−2. Finally, the post processing circuit 118 may perform the post-processing step 162 and the display 120 may perform display step 164 as before.

Figure 5:
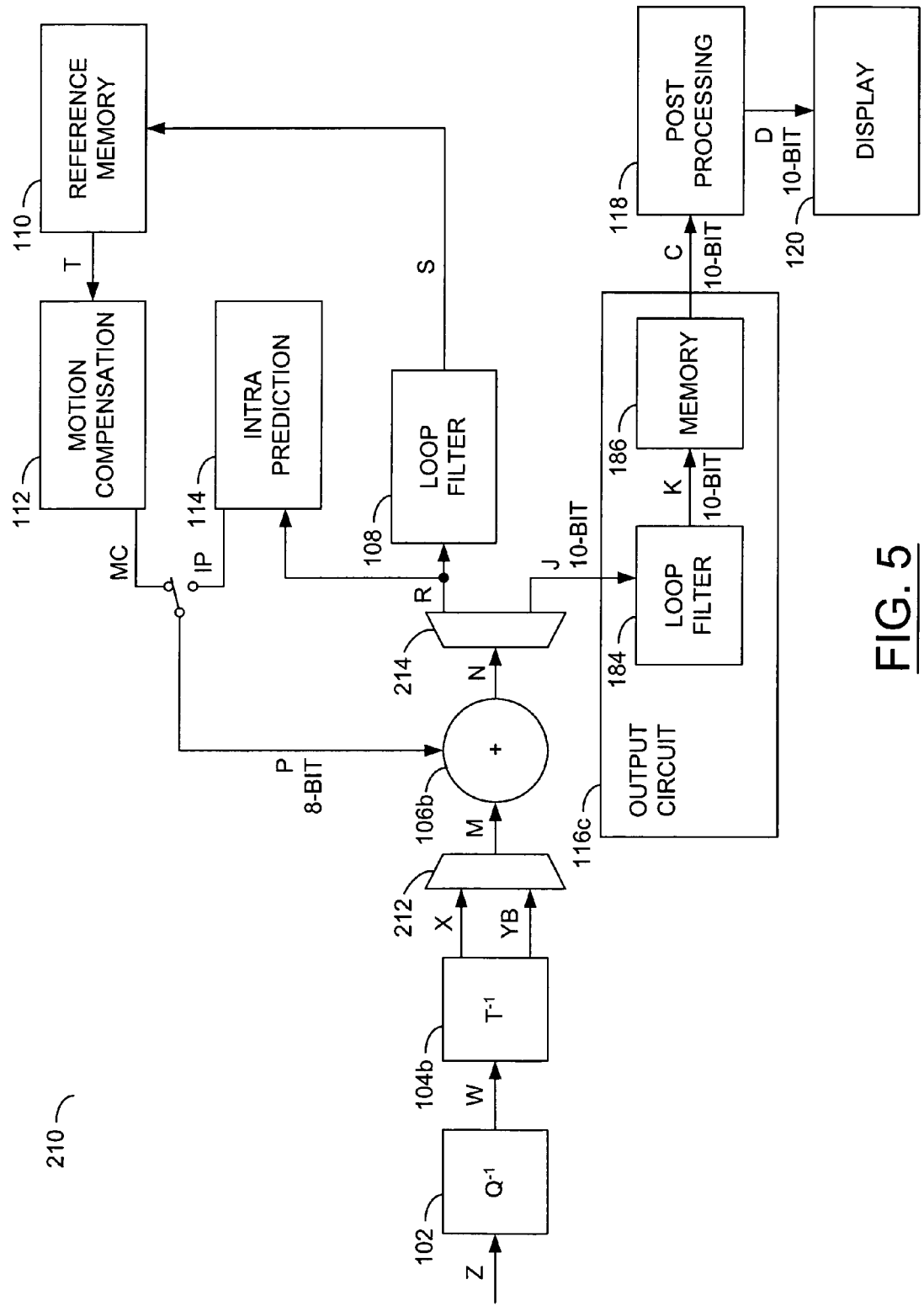
FIG. 5 is a block diagram of an example implementation of a third apparatus.

Referring to FIG. 5, a block diagram of an example implementation of another apparatus 210 is shown. The apparatus 210 may be implemented as a decoder apparatus (or system). The decoder apparatus 210 generally comprises the inverse quantization circuit 102, the inverse transform circuit 104b, a predictor adder circuit 106b, the loop filter circuit 108, the reference memory circuit 110, the motion compensation circuit 112, the intra prediction circuit 114, an output circuit 116c, the post processing circuit 118, the display 120, a multiplexer circuit (or module) 212 and a demultiplexer circuit (or module) 214. The multiplexer circuit 212 may present a block (or signal) (e.g., M) from one of (i) the normal block X and (ii) the second alternate block YB, one at a time. The demultiplexer circuit 214 may present the reconstructed block R and the second reconstructed block J from a block (or signal) (e.g., N), one at a time. The output circuit 116c may receive the reconstructed block J. The predictor adder circuit 106b may be operational to add the predictor block P to the intermediate input block M to generate the intermediate output block N. The predictor adder circuit 116b, the multiplexer circuit 212 and the demultiplexer circuit 214 may each be configured to operate at the higher bit-depth (e.g., 10-bit).

The output circuit 116c generally comprises the second loop filter circuit 184 and the memory circuit 186. The second loop filter circuit 184 may receive the reconstructed block J from the demultiplexer circuit 214. Functionality of the second predictor adder circuit 182 (FIG. 3) may be implemented in the predictor adder circuit 106b.

In operation, the decoder apparatus 210 may perform similar to the decoder apparatus 180 except that the predictor adder circuit 106b may be time shared between the normal block X and the second alternate block YB. During a first period, the predictor adder circuit 106b may add the predictor block P and the normal block X to generate the reconstructed block R. During a second period, the predictor adder circuit 106b may add the predictor block P and the second alternate block YB to generate the reconstructed block J.

Figure 6:
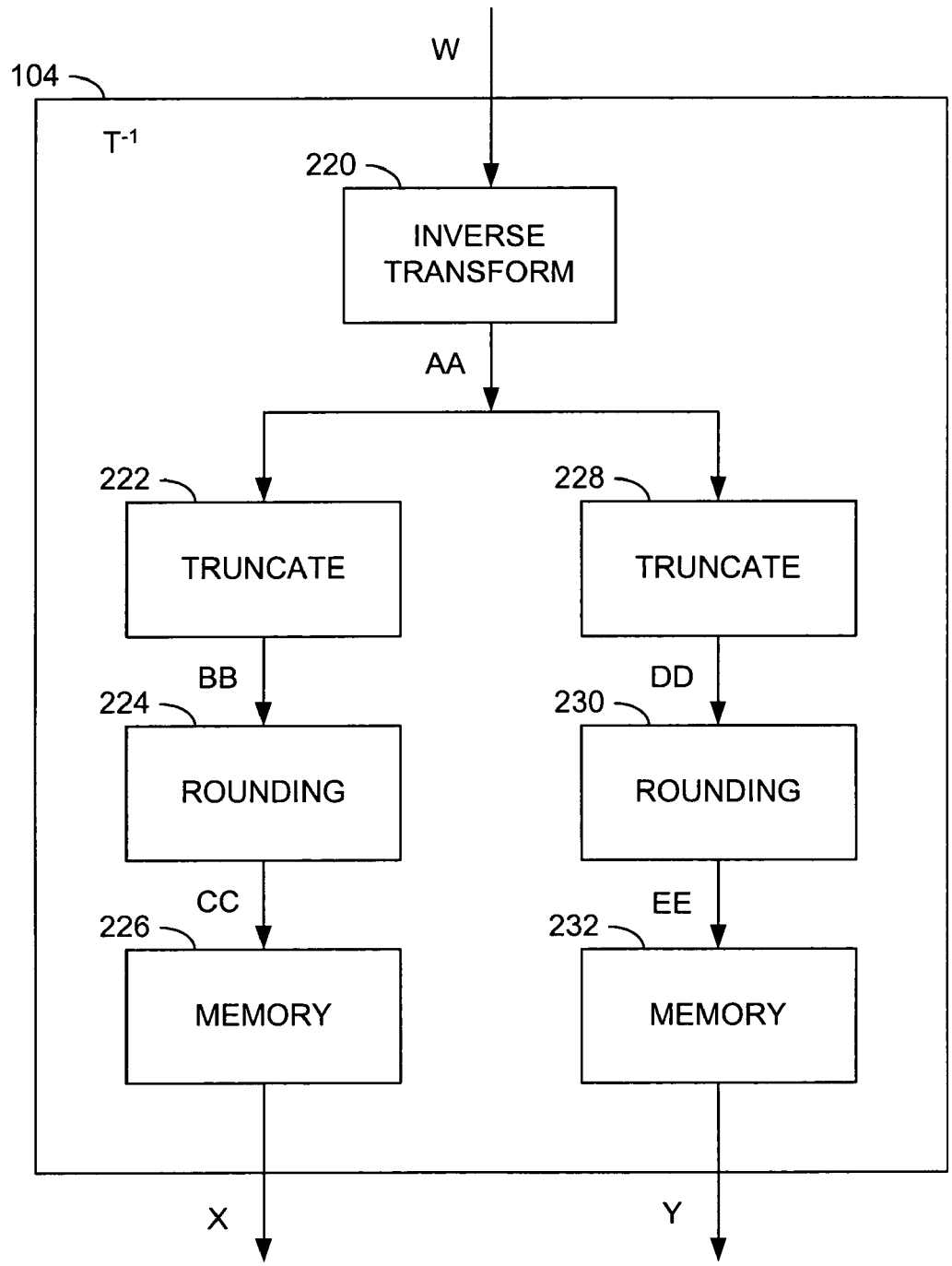
FIG. 6 is a block diagram of an example implementation of an inverse transform circuit.

Referring to FIG. 6, a block diagram of an example implementation of an inverse transform circuit 104 is shown. The inverse transform circuit 104 may used to implement the circuit 104a and/or 104b. The inverse transform circuit 104 generally comprises a circuit (or module) 220, a circuit (or module) 222, a circuit (or module) 224, an optional memory circuit (or module) 226, a circuit (or module) 228, a circuit (or module) 230 and an optional memory circuit (or module) 232. The circuit 220 may receive the rescaled block W. The normal block X may be generate by the circuit 226. The alternate block Y (e.g., YA or YB) may be generated by the circuit 232.

The circuit 220 may be referred to as a standard inverse transform circuit. The inverse transform circuit 220 may be operational to perform an IDCT transform on the rescaled block W to generate a block (e.g., AA). The IDCT transform generally does not include the bit-depth reduction or the rounding operations. The transformed block AA may be presented to the circuits 222 and 228.

The circuit 222 may be referred to as a standard truncation circuit. The standard truncation circuit 222 may be operational to truncate one or more bits from each image element of the transformed block AA to slightly more (e.g., 9-bit) than the normal bit-depth. In one embodiment, the truncation operation may be implemented as a left shift by an appropriate number of bits. The standard truncation circuit 222 may presented the truncated image element values in a block (e.g., BB) to the block 224.

The rounding circuit 224 may be referred to as a standard rounding circuit. The standard rounding circuit 224 may be operational to round the image element values of the truncated block BB to generate a block (or signal) (e.g., CC). The memory circuit 226 may buffer the rounded block CC which is later presented as the normal block X.

The circuit 228 may be referred to as a second truncation circuit. The second truncation circuit 228 may be operational to perform a bit-depth reduction on the individual image element values of the transformed block AA to generate a block (or signal) (e.g., DD). Truncation may be implemented per step 154 (FIG. 2) or step 202 (FIG. 4).

The circuit 230 may be referred to as a second rounding circuit. The second rounding circuit 230 may be operational to generate a block (or signal) (e.g., EE) by rounding the image element values of the truncated block DD. Rounding may be implemented per step 154 (FIG. 2) or step 202 (FIG. 4). The memory circuit 232 may be operational to buffer the rounded block EE which is later presented as the alternate block Y.

The present invention may provide a viable alternative to using full 10-bit video signal paths and syntax from end to end (e.g., cameras, encoders, storage media, transmission media, decoders and displays). Instead, the conventional 8-bit compressed video syntax is generally used for compatibility with existing infrastructure and deployed products. Studios may use the authoring techniques of the present invention whereby standard 8-bit compressed video streams may be decoded successfully by existing 8-bit video decoders for use with 8-bit resolution displays. Enhanced 10-bit video decoders may decode the same 8-bit compressed video streams into 10-bit data for use with 10-bit resolution displays. The enhanced 10-bit output may render gradual chroma gradients with very smooth author-controlled fidelity. The high fidelity may be possible since DC coefficients of the chroma blocks may be expanded, rather than compressed, by the quantization stage (not shown) using a small weight value and a small quantizer value.

The present invention may be applied to any system implementing a display having a higher resolution than provided in the video syntax. Benefits of the present invention may be most apparent where the video syntax has an 8-bit capacity, 2 extra bits are available from the video source for authoring and the display generally has a 10-bit capability. A result may be an improved consumer video quality while maintaining the advantage of the existing 8-bit compressed stream infrastructure.

The present invention may be implemented with minimal additional complexity compared with conventional decoder designs. For the method 140, storage of the additional bits may be performed only for pictures reordered for display (e.g., I pictures and P pictures for MPEG-2, but not B pictures), and each pixel is treated independently with simple arithmetic operations (e.g., decrement, bit-appending, rounding, etc.) For an MPEG-2 video embodiment, the method 140 generally produces a result that matches the method 200, except in cases where pixel clipping has occurred after adding the decoded transform residual to the predictor. Since the end-cases result in extremely saturated video, the visual quality of the method 140 may be quite competitive with the method 200.

By prematurely rounding the output of the inverse transform to 8-bits for proper drift free decoding, the information contained in the lower bits of the conventional inverse transform result may be lost for display purposes. The lost bits generally contain a best estimate available from the compressed video stream (without other apriori knowledge about the source) for fine image details (e.g. the best values to use for the 9th and 10th bits of the video.)

The present invention generally permits both (i) correct drift free decoding (by performing compliant rounding) and (ii) retaining the lower bits of the inverse transform to aid in forming a 10-bit display output from the 8-bit decoded video. In addition, the extra bits may yield a smooth interpolation of the 8-bit values that significantly reduces visible contouring. An assumption that transform-based video compression techniques make in order to compress video may be that the video is smooth. (Truly random noise cannot be compressed efficiently.) As such, an output of the inverse transform generally reproduces in the reconstructed residual the smooth basis functions of the inverse transform (e.g., cosine forms in the case of the IDCT). By prematurely truncating the output of the inverse transform to 8-bits, the smooth representation that may be contained in the lower bits of the inverse transform result is lost.

The figures generally demonstrate how to use the present invention in a transform-based video decoder (e.g., MPEG-2 decoder, H.264 decoder, Windows Media 9 (SMPTE VC-1) decoder, etc). The invention is equally applicable to transform-based image decoders (e.g., JPEG decoding). The invention may also be useful for decoding of transform-coded audio signals to increase the bit-depth more accurately than simple post-processing that does not make use of additional bits from the inverse transform prior to rounding.

The function performed by the flow diagrams of FIGS. 2 and 4 may be implemented using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for processing a video block extracted from an encoded bitstream, comprising the steps of:
    (A) generating a normal block using a circuit by inverse transforming said video block, (i) said normal block comprising a plurality of image elements and (ii) each of said image elements in said normal block having a normal bit-depth;
    (B) generating an alternate block from said video block, said alternate block comprising image detail (i) present after said inverse transforming and (ii) absent from said normal block, wherein said normal block and said alternate block come from a same image spatially and temporally; and
    (C) generating an output block based on said normal block and said alternate block, said output block having an output bit-depth greater than said normal bit-depth.

2. The method according to claim 1, further comprising the step of:
    generating a transform block by inverse transforming said video block, (i) said transform block comprising said image elements, (ii) each of said image elements in said transform block having a transform bit-depth greater than said normal bit-depth, and (iii) both said normal block and said alternate block are generated from said transform block.

3. The method according to claim 2, wherein said image detail of said alternate block comprises a plurality of least significant bits of each of said image elements in said transform block.

4. The method according to claim 3, wherein said output bit-depth comprises a 10-bit depth and said normal bit-depth comprises an 8-bit depth.

5. The method according to claim 2, wherein step (B) comprises the sub-step of:
    truncating each of said image elements in said transform block to an intermediate bit-depth greater than said output bit-depth.

6. The method according to claim 5, wherein step (B) comprises the sub-step of:
    generating said alternate block by rounding each said image elements in said transform block to said output bit-depth after said truncating.

7. The method according to claim 1, further comprising the step of:
    generating a reconstructed block by adding a predictor block to said normal block.

8. The method according to claim 7, wherein step (C) comprises the sub-step of:
    combining said reconstructed block and a portion of said alternate block.

9. The method according to claim 7, wherein step (C) comprises the sub-step of:
    adjusting said reconstructed block to undo a rounding of said image elements in said normal block.

10. The method according to claim 7, wherein step (C) further comprises the sub-step of:
    appending a plurality of first bits in said alternate block to a respective plurality of second bits in said reconstructed block per each of said image elements in said reconstructed block.

11. The method according to claim 10, further comprising the step of:
    rounding each of said image elements in said output block down to said output bit-depth after said appending.

12. The method according to claim 1, further comprising the step of:
    storing said alternate block prior to generating said output block to enable display reordering.

13. A method for processing a single video block extracted from an encoded bitstream, comprising the steps of:
    (A) generating a normal block by inverse transforming said single video block, said normal block (i) comprising a plurality of image elements and (ii) each of said image elements in said normal block having a normal bit-depth;
    (B) generating an alternate block from said single video block, said alternate block having an alternate bit-depth greater than said normal bit-depth, wherein said normal block and said alternate block come from a same image spatially and temporally; and
    (C) generating an output block by adding a predictor block to said alternate block using a first adder circuit, said output block having an output bit-depth greater than said normal bit-depth.

14. The method according to claim 13, further comprising the step of:
    generating a transform block by inverse transforming said single video block, (i) said transform block comprising said image elements, (ii) each of said image elements in said transform block having a transform bit-depth greater than said alternate bit-depth, and (iii) both said normal block and said alternate block are generated from said transform block.

15. The method according to claim 14, wherein step (B) comprises the sub-step of:
    bit reducing each of said image elements in said transform block to an intermediate bit-depth greater than said alternative bit-depth.

16. The method according to claim 15, wherein step (B) further comprises the sub-step of:
    generating said alternate block by rounding each of said image elements in said transform block to said alternative bit-depth after said bit reducing.

17. The method according to claim 13, further comprising the step of:

generating a reconstructed block by adding said predictor block to said normal block using a second adder circuit.

18. The method according to claim 13, wherein said output bit-depth comprises a 10-bit depth and said normal bit-depth comprises an 8-bit depth.

19. An apparatus comprising:

an inverse transform circuit configured to generate (i) a normal block from a video block extracted from an encoded bitstream and (ii) an alternate block from said video block, (a) said normal block comprising a plurality of image elements, (b) each of said image elements in said normal block having a normal bit-depth and (c) said alternate block having image detail absent from said normal block, wherein said normal block and said alternate block come from a same image spatially and temporally; and an output circuit configured to generate an output block based on said normal block and said alternate block, said output block having an output bit-depth greater than said normal bit-depth.

20. The apparatus according to claim 19, further comprising an adder configured to generate a reconstructed block by adding said normal block to a predictor block, wherein said output circuit is further configured to adjust said reconstructed block to undo a rounding of said image elements in said normal block.

21. The apparatus according to claim 19, further comprising a first adder configured to generate a reference block by adding said normal block to a predictor block, wherein said output circuit comprises a second adder configured to add said alternate block to said predictor block.

22. The apparatus according to claim 21, further comprising a motion compensation block utilizing said reference block.

23. The apparatus according to claim 19, further comprising an adder configured to generate an intermediate block by adding said alternative block to a predictor block, wherein said output circuit generates said output block from said intermediate block.

* * * * *